UNITED STATES PATENT OFFICE.

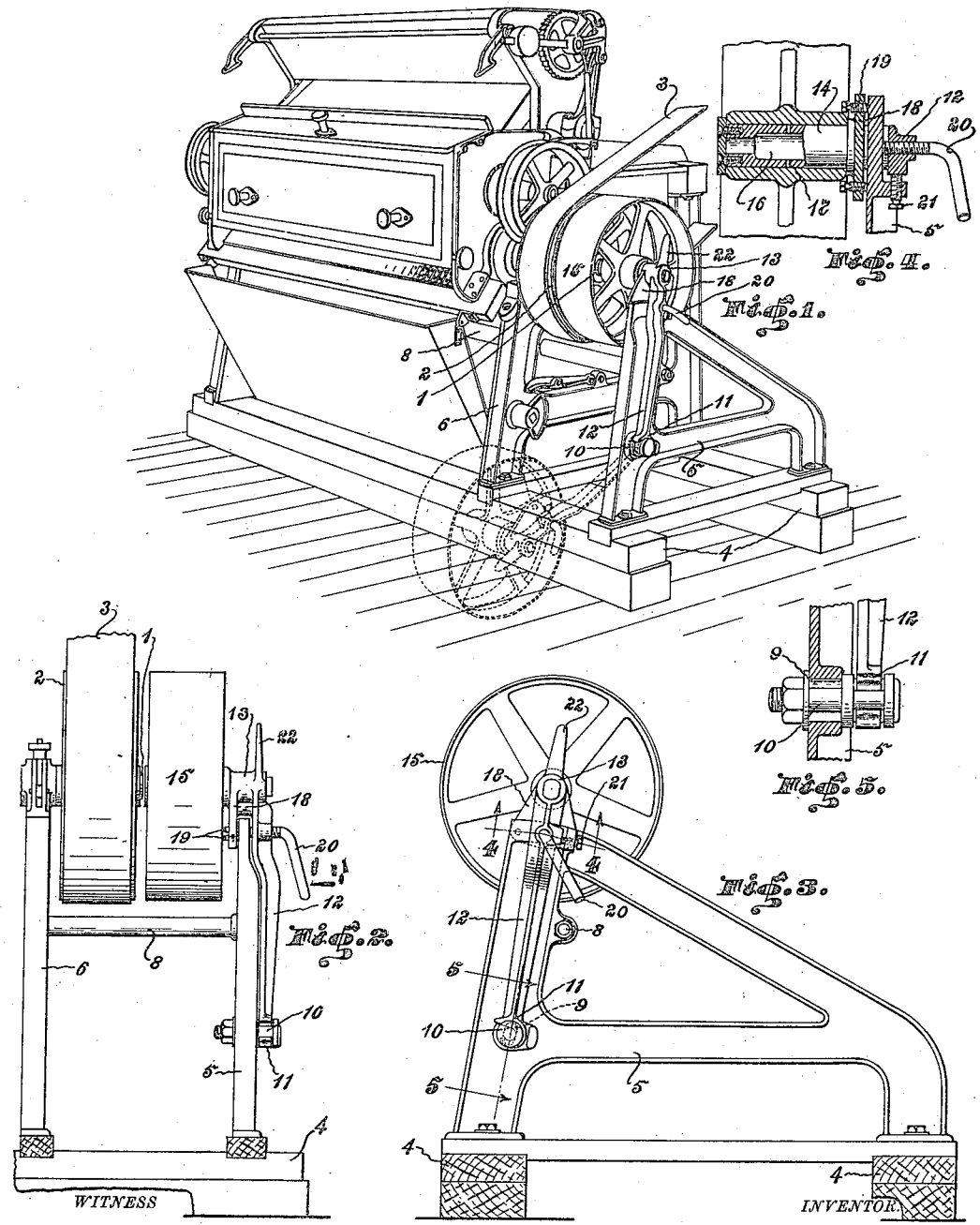

NELSON B. HENRY, OF ATLANTA, GEORGIA, ASSIGNOR TO THE MURRAY COMPANY, OF DALLAS, TEXAS, A CORPORATION.

IDLER-PULLEY ATTACHMENT FOR LINTERS AND SIMILAR MACHINES.

1,262,044.         Specification of Letters Patent.         Patented Apr. 9, 1918.

Application filed May 2, 1916. Serial No. 94,856.

*To all whom it may concern:*

Be it known that I, NELSON B. HENRY, a citizen of the United States, residing at Atlanta, in the county of Fulton and State of Georgia, have invented certain new and useful Improvements in Idler-Pulley Attachments for Linters and Similar Machines, of which the following is a specification.

My invention has relation to an attachment in the nature of a removable idler pulley with demountable frame for use with any one of a series of power driven machines arranged in sets or gangs, and driven from a common countershaft, whereby each machine in series may have its main revoluble part disconnected from the countershaft by installing the attachment, and shifting the driving belt to the idler pulley, thus installed, without interfering with the continuous operation of the remaining machines of the set.

In certain classes of machines, notably linters for removing cotton from the seed, a main revoluble part, for instance the saw cylinder, must be removed with more or less frequency from the machine, for adjustment or repairs. In the old type of linter, the saw cylinder and the brush cylinder were driven through gearing by a single belt arranged to be shifted from a power pulley to an adjacent idler pulley, both on the shaft of the saw cylinder. When these machines are arranged in gangs or sets, and all driven from a common countershaft, it has been necessary in order to remove the revoluble part, say the saw cylinder, from any one machine, to stop the countershaft and slip the belt from off of both pulleys. This means that the entire gang of machines must be put out of operation every time the revoluble part of any one machine is removed for adjustment or repairs.

To enable each machine to be disconnected from the countershaft without stopping the operation of the remaining machines driven from said countershaft, constitutes the main object of my invention.

In the carrying out of my invention, the revoluble part in each machine which must be frequently removed from the machine for repairs or adjustment, has on its shaft a single pulley connected by belt direct with the countershaft. An auxiliary frame is provided, which may be readily attached to, or detached from the floor or skids for the machine, adjacent to the main frame of the machine, from which the shaft of the revoluble part with the pulley projects. In the auxiliary frame is pivotally supported one end of an arm carrying at its other end the bearing for a stub shaft, to which an idler pulley is secured. Means have been provided for adjusting the stub shaft and bearing in said arm in vertical and lateral planes, to thereby bring the stub shaft in true alinement with the shaft of the removable revoluble part. The stub shaft has been made hollow to receive lubricant, and the stub shaft is provided with ducts to lead the lubricant to the pulley bearing surface.

The nature and scope of my invention will be more fully understood from the following description, taken in connection with the accompanying drawings, forming part hereof, in which Figure 1 is a perspective view of a linter provided with an attachment embodying the main features of my invention.

Fig. 2 is a front elevational view of the attachment, shown in operative position adjacent to the shaft, and driving pulley of a removable revoluble part of a machine.

Fig. 3 is a side elevational view of the attachment.

Fig. 4 is a sectional view taken on line 4—4, of Fig. 3, and

Fig. 5 is a sectional view taken on line 5—5 of Fig. 3.

In the drawings I have illustrated the invention as particularly adapted for use in conjunction with a linter. In such a machine, as adapted for use with my invention, the saw cylinder has its shaft 1 provided with a driving pulley 2 fast on the shaft, and connected by belt 3 with a counter shaft not shown. The linter is supported upon a platform or skids 4, and its saw cylinder and shaft 1 are arranged in the usual bearings so as to be readily removed from the machine from time to time to resharpen the saw teeth. Adjacent to the pulley 2 and detachably supported upon the platform 4 is an auxiliary frame 5 maintained in substantially parallel relationship with an end frame 6 of the linter, by a removable or detachable rod 8. At or near the front of the frame 5 and above its base, is formed a slot 9 in which is adjustably secured a bolt 10. The bolt 10 is arranged to be engaged by the hook-shaped end 11 of an arm 12, to constitute a pivotal support for said arm. The upper end of arm 12 carries the bearing or sleeve 13, constituting the support for a stub shaft 14, on which revolves the idler pulley 15.

In practice it has been found desirable to make the shaft 14 hollow to constitute a lubricating chamber 16 (see Fig. 4) and to pierce the periphery of shaft 14 with ducts 17, to feed the lubricant from chamber 16 to the bearing surface of the pulley hub.

The sleeve or bearing 13 has a cheek block 18 depending from the inner edge of sleeve 13 and parallel with the arm 12. The arm 12 when in raised operative position brings the bearing 13 above the frame 5 with the upper portion of the frame inclosed between block 18 and the arm 12.

Set screws 19 traversing block 18 and bearing upon the frame 5, and a handled screw pin 20 traversing the arm 12 and bearing upon the frame 5 (see Fig. 4) constitute an adjustable means for locking the arm and bearing 13 to the frame. A set screw 21 traversing the frame 5 from the rear constitutes an adjustable stop to limit the movement of bearing 13 as it swings over the frame.

The movement of pivoted bolt 10 in slot 9 of frame 5, constitutes a means for adjusting vertically the position of bearing 13.

In use the arm 12 is hooked over the bolt 10 and by means of a handle 22 projecting from the arm 12, the pulley 15 is raised to its proper position—the various adjustments being made. The pulley 15 is then locked to position on the frame, and the belt 3 shifted from pulley 2 to pulley 15. The part revolving with shaft 1 can then be readily removed and replaced without stopping the movement of belt 3, and countershaft which drives said belt. The remaining machines continue to be driven by the countershaft during the temporary or continued stoppage of the machine to be repaired.

When not in use and when it is desired to attach the idler pulley 15 to another machine, the arm 12 is lowered (see Fig. 1) until the pulley 15 rests in the floor, the arm is unhooked from the bolt 10 and the attachment may be rolled or carried to the next machine.

In practice, it will be found advisable to equip each machine with an auxiliary frame 5, although the frame 5 itself can be readily removed and installed adjacent to successive machines in the gang, if desired, in which instance but one frame 5 is necessary.

Having thus described the nature and objects of my invention, what I claim as new, and desire to secure by Letters Patent, is

In a device of the character described, an auxiliary frame detachably fixed in substantially parallel relationship with an end frame of a machine to which the device is to be attached, an arm having one end detachably and pivotally engaging the auxiliary frame at or near the base thereof, said arm projecting some distance at its upper end above said auxiliary frame, a bearing formed in said upper end of said arm, a stub shaft supported by said bearing, a cheek block depending from the inner edge of said bearing and parallel to said arm, said arm and block inclosing the upper portion of the frame and means for clamping the arm and block to said frame.

In testimony whereof I have signed my name to this specification.

NELSON B. HENRY.

Copies of this patent may be obtained for five cents each, by addressing the "Commissioner of Patents, Washington, D. C."